United States Patent [19]
Birkholz et al.

[11] Patent Number: 5,183,705
[45] Date of Patent: Feb. 2, 1993

[54] PRESSURE-SENSITIVE ADHESIVE COMPOSITION HAVING HIGH SHEAR STRENGTH

[75] Inventors: Ronald B. Birkholz, White Bear Lake; Mark D. Glad, St. Paul, both of Minn.

[73] Assignee: Minnesota Mining and Manufacturing Company, St. Paul, Minn.

[21] Appl. No.: 843,513

[22] Filed: Feb. 28, 1992

[51] Int. Cl.$^5$ ............................................... C09U 7/02
[52] U.S. Cl. .................................. 428/343; 428/349; 428/411.1; 428/413; 428/437; 428/451; 428/537.5; 524/474; 524/484; 524/485
[58] Field of Search ....................... 524/474, 484, 485; 428/500, 413, 447, 451, 411.1, 343, 349, 537.5

[56] References Cited

U.S. PATENT DOCUMENTS

| | | | |
|---|---|---|---|
| 3,078,254 | 2/1963 | Zelinski et al. | 260/45.5 |
| 3,135,716 | 6/1964 | Uraneck et al. | 260/45.5 |
| 3,149,182 | 9/1964 | Porter | 260/879 |
| 3,239,478 | 3/1966 | Harlan | 260/27 |
| 3,468,972 | 9/1969 | Hsieh et al. | 260/836 |
| 3,594,452 | 7/1971 | De La Mare et al. | 260/880 |
| 3,595,941 | 7/1971 | Farrar et al. | 260/879 |
| 3,753,936 | 8/1973 | Marrs et al. | 260/27 |
| 3,935,338 | 1/1976 | Robertson | 427/207 |
| 3,954,692 | 5/1976 | Downey | 260/33.6 |
| 4,096,203 | 6/1978 | St. Clair | 525/99 |
| 4,699,816 | 10/1987 | Galli | 428/500 |

OTHER PUBLICATIONS

"New Anionic Syntheses of Star-Branched Polymers" by R. P. Quirk, S-H Guo, M. Alsamarraie and F. Ignatz-Hoover, *Polymer preprints*, vol. 29, pp. 298-299 (Sep. 1988).

"Dilithium Initiators Based on 1,3,5-bis (1-phenylethenyl) benzene, Tetrahydrofuran and Lithium sec-Butoxide Effects" by R. P. Quirk and J. J. Ma, *Polymer International*, 24 pp. 197-206 (1991).

*Primary Examiner*—Jacob Ziegler
*Attorney, Agent, or Firm*—Gary L. Griswold; Walter N. Kirn; David L. Weinstein

[57] ABSTRACT

This invention provides a normally tacky pressure-sensitive adhesive composition comprising (1) a radial teleblock copolymer having at least three monoalkenyl arene polymer blocks and a branched elastomeric conjugated diene polymer block, (2) a tackifying resin, and (3) from about 5 to about 20 parts by weight extending oil per 100 parts by weight of radial copolymer. The copolymer preferably has a molecular weight of about 180,000 to about 250,000, as expressed in polystyrene equivalent molecular weight units. The monoalkenyl arene polymer blocks preferably comprise from about 17% to about 23% by weight of the total molecular weight of the copolymer. The preferred polymer for the monoalkenyl arene block is polystyrene; the preferred polymer for the elastomeric conjugated diene block is polyisoprene.

26 Claims, No Drawings

PRESSURE-SENSITIVE ADHESIVE COMPOSITION HAVING HIGH SHEAR STRENGTH

BACKGROUND OF THE INVENTION

1. Field of the Invention

This invention relates to normally tacky pressure-sensitive adhesive compositions, and, more particularly, tapes that utilize such compositions.

2. Discussion of the Art

Pressure-sensitive adhesive tape that is especially suited for sealing boxes must exhibit a relatively high value of shear strength. At the same time, it is preferred that the tape be relatively soft and be economically feasible. On the basis of economics, it would be desirable for the adhesive to be hot-melt coatable.

U.S. Pat. No. 3,954,692 discloses a mixture of (a) an unvulcanized elastomeric block copolymer having the general configuration A - B - A wherein each A is an independently selected nonelastomeric monovinyl aromatic hydrocarbon polymer block having an average molecular weight of 2,000 to 100,000, the total block A content being from about 10 to about 50% by weight of the copolymer, and B is an elastomeric conjugated diene polymer block having an average molecular weight from about 25,000 to about 1,000,000, and (b) a compatible, thermoplastic tackifying resin containing carbon-to-carbon unsaturation therein and derived from hydrocarbons having from 5 to 8 carbon atoms and at least one carbon-to-carbon double bond therein selected from aliphatic hydrocarbons and alicyclic hydrocarbons.

U.S. Pat. No. 3,239,478 discloses an adhesive comprising a block copolymer having a general configuration A - B - A wherein each A is a thermoplastic polymer block and which is relatively incompatible with the elastomeric B segment; the average molecular weight of each A being between about 5,000 and 125,000; B is a polymer block of a conjugated diene, the average molecular eight of the blocks being between about 15,000 and about 250,000; the total of blocks A being less than about 80% by weight of the block copolymer; in addition to the block copolymer a tackifying resin and a particular extender oil, said oil being substantially incompatible with homopolymers of the aforesaid thermoplastic terminal blocks and being substantially compatible with homopolymers of the aforesaid conjugated diene. Compositions of the block copolymer described above with 5 to 200 phr (preferably 25 to 125 phr) (parts per hundred of block copolymer) of extending oil and 25 to 300 phr (preferably 50 to 200 phr) of a tackifying resin were disclosed. By adjustment of the proportions of the three basic ingredients and choice of molecular weight of copolymer, melting point and type of tackifying resin, compatibility of oil and resin with the copolymer, a hot-melt adhesive can be provided.

U.S. Pat. No. 3,753,936 discloses (A - B)$_x$Y type polymers wherein A represents nonelastomeric polymer blocks, or segments, and B represents elastomeric polymer segments. Y is an atom or group of atoms derived from a polyfunctional treating agent used in the formation of the radial polymers, and x is an integer of at least 3 and can be equal to the number of functional groups of said polyfunctional treating agent. The radial block polymer thus can be characterized as having at least three polymer branches with each branch of the radial block polymer comprising terminal nonelastomeric segments. The branches of the radial block polymer contain a terminal nonelastomeric segment attached to an elastomeric polymer segment. Although the polymer can be used in an adhesive composition, it is not expected to be useful in a hot-melt formulation.

U.S. Pat. No. 3,935,338 discloses block copolymers having at least two monoalkenyl arene polymer blocks and at least one elastomeric conjugated diene polymer block. The macromolecular configuration may be either linear or radial dependent upon the method by which the block copolymer was formed. Typical block copolymers of the most simple configuration would have the structure polystyrene-polyisoprene-polystyrene, and polystyrene-polybutadiene-polystyrene. The adhesive composition of U.S. Pat. No. 3,935,338 calls for 25 to 100 parts by weight extending oil per hundred parts by weight rubber. The addition of even a moderate amount of oil drastically reduced the peel adhesion and the shear adhesion failure temperature, thus indicating that such compositions would be unsatisfactory in many adhesive applications even though the addition of oil did, in fact, substantially reduce the viscosities of the hot melts derived therefrom.

SUMMARY OF THE INVENTION

This invention provides a normally tacky pressure-sensitive adhesive composition comprising (i) a radial teleblock copolymer having at least three monoalkenyl arene polymer blocks and a branched elastomeric conjugated diene polymer block, (2) a tackifying resin, and (3) from about 5 to about 20 parts by weight extending oil per hundred parts by weight of radial copolymer. The copolymer preferably has a molecular weight of about 180,000 to about 250,000, as expressed in polystyrene equivalent molecular weight units. The monoalkenyl arene polymer blocks preferably comprise from about 17% to about 23% by weight of the total molecular weight of the copolymer. The preferred polymer for the monoalkenyl arene block is polystyrene; the preferred polymer for the elastomeric conjugated diene block is polyisoprene. Because only 5 to 20 parts by weight extending oil per 100 parts by weight of radial copolymer is needed with this composition in order to impart superior peel adhesion and shear properties, as well as the desired melt viscosities for pressure-sensitive adhesives, the composition of this invention provides a superior adhesive for hot-melt coating of pressure-sensitive tapes suitable for sealing containers.

DETAILED DESCRIPTION

As used herein, all "parts" and "percentages" are "parts by weight" or "percentages by weight", respectively, unless indicated otherwise.

This invention provides a normally tacky, pressure-sensitive adhesive composition having high shear strength. The composition comprises (1) a radial teleblock copolymer, (2) a tackifying resin, and (3) an extending oil. The composition requires only 5 to 20 parts by weight extending oil per 100 parts by weight of radial copolymer. The invention further provides a coated article comprising a substrate, e.g. a sheet, film, or the like, having a coating of the adhesive on at least one major surface thereof.

The radial teleblock copolymers suitable for the invention can be characterized as having at least three branches, alternatively referred to herein as arms, each of which has a terminal monoalkenyl arene polymeric block linked to an elastomeric conjugated diene polymeric block, which is in turn linked to a central multifunctional linking agent of the copolymer. The central multifunctional linking agent of the copolymer may be a single atom or a group of atoms derived from the residue of a multifunctional coupling agent or a multifunctional initiator.

The radial teleblock copolymers may be further described by the following structure:

$$(AB)_n\text{-}Z$$

where
Z represents the residue of a coupling agent,
n represents an integer equal to or greater than 3, preferably the integer 3 or 4,
each AB group represents an arm,
A represents a terminal monoalkenyl arene polymeric block,
and B represents a conjugated diene polymeric block. This type of branched copolymer may also be made without a coupling agent. For example, such copolymers can be made with trifunctional initiators such that all three arms of the copolymer grow outwardly from the trifunctional initiator. Such copolymers have the formula:

$$(AB)_n\text{-}Z$$

where
Z represents the residue of an initiator, n represents the integer 3, and AB, A, and B are as described previously.

The monoalkenyl arene blocks of the copolymer preferably comprise from about 17% to about 23% by weight of the copolymer to ensure adequate cohesion properties. The molecular weight of each monoalkenyl arene block preferably ranges from about 11,000 to about 13,000, and is most preferably about 12,000. The molecular weight of the copolymer preferably ranges from about 180,000 to about 250,000, as measured in linear polystyrene equivalent molecular weight units, to ensure proper melt viscosity in the adhesive. In the copolymers suitable for the invention, the preferred species for the monoalkenyl arene polymeric block is polystyrene and the preferred species for the conjugated diene polymeric block is polyisoprene.

In the weight fractions given above, the numbers 17% to 23% by weight represent values that are particularly useful when the alkenyl arene block is polystyrene and the conjugated diene block is polyisoprene. It will be apparent to those of ordinary skill in the art that minor adjustments in these values will be necessary when other monomers are chosen, depending on the molecular weight of the monomer. When the conjugated diene block is made from isoprene, polymerization techniques are preferably chosen so that predominately cis-1,4-polyisoprene stereoisomer is produced. This stereoisomer has a glass transition temperature of less than −50° C. as measured by differential scanning calorimetry at a 10° C. per minute scan rate. This type of isoprene polymerization will ensure that the polyisoprene block will be compatible with the tackifying resin.

Alkenyl arene monomers other than styrene may be used, such as, for example, vinyl aryl compounds, such as various alkyl-substituted styrenes, alkoxy-substituted styrenes, 2-vinyl pyridine, 4-vinyl pyridine, vinyl naphthalene, alkyl-substituted vinyl naphthalenes, and the like. Alkyl-substituted conjugated diene monomers that may be used in place of isoprene preferably contain from five to eight carbon atoms.

The polymer of the alkenyl arene block is preferably insoluble in the polymer of the conjugated diene block. It has been found that the alkenyl arene blocks pack together to form domains in the continuous phase formed by the conjugated diene blocks The relatively uniform length of the alkenyl arene blocks allows for close packing to form the aforementioned domains. The formation of domains brings about an increase in shear strength.

The load-bearing capacity of a block copolymer normally suitable for use in adhesives is defined broadly as the percent by weight of $(AB)_n\text{-}Z$ polymeric species that are present in the polymer before it is compounded with other ingredients to provide the desired adhesives. The load-bearing capacity can be expressed as follows:

$$\text{Load-bearing capacity} = \frac{(\text{Amount of } (AB)_n - Z)}{(\text{Amount of }(AB)_n - Z) + (\text{Amount of other polymeric species})} \times 100\%$$

where
n represents a number greater than or equal to 2
and Z has a functionality of at least 2.

The load-bearing capacity of the copolymer of this invention must be greater than about 85% to give the copolymer high cohesive strength. Any conjugated diene polymeric species in the copolymer that does not have a terminal alkenyl arene block on at least two arms is regarded as non-load-bearing. These types of non-load-bearing copolymers may be present in the copolymers to a small extent, i.e., up to 15% by weight of total copolymer, depending on the method of synthesis and skills of the synthesizer. Likewise, up to 2% of the copolymer composition (preferably less than 1%) may be polystyrene homopolymer, depending on the method of synthesis.

It can readily be seen by examination of the polymeric structures that the occurrence of cleavage in the polyisoprene elastomeric block in 10% of a styrene-isoprene-styrene linear block copolymer results in retention of 90% of the load-bearing capacity of the original block copolymer. It can also be readily seen by examination of the polymeric structures that the occurrence of the same number of cleavage events in the polyisoprene blocks of the elastomeric segment of the copolymers of this invention results in retention of over 95%, typically over 97%, of the load-bearing capacity of the original block copolymer, if all cleavable sites are equally accessible and reactive. This increase in retention of load-bearing capacity occurs because the cleavage of one arm results in two segments—a linear styrene-isoprene-styrene block copolymer, which continues to be load-bearing and a polystyrene-polyisoprene segment, which is non-load-bearing. Thus, the compounds of the invention exhibit good shear properties and long life in the shear test procedures described hereinafter under the extreme conditions used in this test.

Adhesive mixing techniques known in the art may cause minor amounts of degradation during processing, such that the copolymer to be used in the invention may give degradation fragments in the adhesive of the invention. The load-bearing capacity of the copolymers in the adhesives of the invention may be less than 85% because of this degradation. It is desirable that such degradation be minimized.

When the copolymers suitable for the invention are made by coupling techniques, the load-bearing capacity is measured by coupling efficiency. A useful technique for determining coupling efficiency is gel permeation chromatography, as described in U.S. Pat. No. 4,096,203, incorporated herein by reference. However, when the copolymers are made from a trifunctional initiator, the conventional meaning of the term coupling efficiency is not used in this context. It will be apparent to those of ordinary skill in the art that the gel permeation chromatography technique described in U.S. Pat. No. 4,096,203 may also be used to determine the load bearing capacity for copolymers made from a trifunctional initiator. The load-bearing capacity of a copolymer made by means of a trifunctional initiator must still be at least 85%.

In general, the copolymers suitable for this invention can be made by solution anionic polymerization techniques, which are known in the art. Copolymers that are particularly suitable for this invention can be prepared according to methods described in Assignee's copending application Ser. No. 07/843,844 filed on Feb. 28, 1992, pending filed on evendate herewith and incorporated herein by reference.

Copolymers containing both aromatic and ethylenic unsaturation can be prepared by copolymerizing one or more polyolefins, particularly a diolefin, with one or more alkenyl aromatic hydrocarbon monomers. The blocks in each arm of the copolymers of this invention are linear.

Copolymers containing ethylenic unsaturation or both aromatic and ethylenic unsaturation may be prepared using free-radical, cationic, or anionic initiators. Such polymers may be prepared by bulk, solution, or emulsion techniques. In any case, the copolymer containing at least ethylenic unsaturation will, generally, be recovered as a solid such as a crumb, a powder, a pellet, or the like. Copolymers containing ethylenic unsaturation and copolymers containing both aromatic and ethylenic unsaturation are, of course, available commercially from several suppliers.

In general, when solution anionic techniques are used, such $(A-B)_n-Z$ block copolymers are prepared by contacting the monomers to be polymerized simultaneously or sequentially with an organoalkali metal compound in a suitable solvent at a temperature within the range from about $-100°$ C. to about $-150°$ C., preferably at a temperature within the range from about $0°$ C. to about $100°$ C. Particularly effective anionic polymerization initiators are organolithium compounds having the general formula:

$$RLi_n$$

wherein;

R represents an aliphatic, cycloaliphatic, aromatic, or alkyl-substituted aromatic hydrocarbon radical having from 1 to about 20 carbon atoms;

and n represents an integer of 1 to 3.

In general, any of the solvents known in the prior art to be useful in the preparation of such copolymers may be used. Suitable solvents include straight- and branched-chain hydrocarbons, such as pentane, hexane, heptane, octane, and the like, as well as alkyl-substituted derivatives thereof; cycloaliphatic hydrocarbons, such as cyclopentane, cyclohexane, cycloheptane, and the like, as well as alkyl-substituted derivatives thereof; aromatic and alkyl-substituted aromatic hydrocarbons, such as benzene, toluene, xylene, and the like; hydrogenated aromatic hydrocarbons, such as tetralin, decalin, and the like. Linear and cyclic ethers, such as dimethyl ether, methyl ethyl ether, anisole, tetrahydrofuran, and the like, may be used in small amounts.

As described in U.S. Pat. No. 4,096,203, the disclosure of which is incorporated herein by reference, the styrene may be contacted with the initiator. Next, the living polymer in solution is contacted with isoprene. The resulting living polymer has a simplified structure A-B-Li. It is at this point that the living polymer is coupled. Coupling is normally only used when a monofunctional initiator is used.

A wide variety of coupling agents can be employed. Any polyfunctional coupling agent that contains at least three reactive sites can be employed. Examples of the types of compounds that can be used as coupling agents include the polyepoxides, polyisocyanates, polyimines, polyaldehydes, polyketones, polyanhydrides, polyesters, polyhalides, and the like. These compounds can contain two or more types of functional groups, such as the combination of epoxy and aldehyde groups, isocyanate and halide groups, and the like. Various other substituents that are inert in the coupling reaction can be present, such as hydrocarbon radicals, as exemplified by the alkyl, cycloalkyl, aryl, aralkyl, and alkaryl groups and the alkoxy, aryloxy, alkythio, arylthio, and tertiary amino groups. Many types of these polyfunctional compounds that are suitable for preparing these copolymers have been described in U.S. Pat. Nos. 3,595,941; 3,468,972, 3,135,716; 3,078,254, and 3,594,452, the disclosures of which are incorporated herein by reference. When the coupling agent has two reactive sites, such as dibromoethane, the polymer will have a linear $(AB)_2-Z$ structure, alternatively designated as AB-BA or more simply A-B-A. When the coupling agent has three reactive sites, such as trisnonylphenylphosphite (TNPP), the polymer will have a branched structure, such as $(A-B)_3-Z$. Because the block copolymers useful herein are predominantly branched with three or four arms, a multifunctional coupling agent with three or more reactive sites must be used. Other phosphite coupling agents that can be used include trimethyl phosphite and triethyl phosphite. Silane coupling agents that can be used include methyl trichlorosilane, methyl trimethoxy silane, and γ-glycidoxy propyl trimethoxysilane.

In the prior art, such as that exemplified by U.S. Pat. Nos. 3,595,941 and 3,468,972, the effort was always made to select the particular coupling agent or reaction conditions that resulted in the highest coupling efficiency. High coupling efficiency is desired herein in order to produce strong adhesive compositions.

Less than maximum coupling efficiency can be achieved by a number of methods, so long as the load-bearing capacity is at least 85%. One method to reduce coupling efficiency is to add less than the stoichiometric amount of coupling agent required for complete coupling of the polymers. Another means of reducing coupling efficiency is by the premature addition of terminator compound. These terminators, such as water or alcohol, react very quickly and can easily be employed to cut short complete coupling of the polymers. In addition, by performing the coupling reaction at elevated temperatures, such as above about 90° C., thermal termination of many of the living polymer groups (A-B-Li) occurs prior to coupling. The typical coupling conditions include a temperature of between about 65° C. to about 75° C. and sufficient pressure to maintain the reactants in a liquid phase.

As stated previously, copolymers useful for the present invention can also be made without coupling by utilizing a trifunctional initiator. In this type of reaction, the polymer arms grow outwardly from the initiator and one copolymer is made rather than making more than one copolymer and coupling them together. Trifunctional initiators suitable for preparing copolymers suitable for this invention can be prepared from the reaction of one equivalent of 1,3,5-tris (1-phenylethenyl) benzene with three equivalents of sec-butyl lithium according to the procedures described in "New Anionic Syntheses of Star-Branched Polymers" by R. P. Quirk, S-H Guo, M. Alsamarraie and F. Ignatz-Hoover, Polymer Preprints, Volume 29, pages 298–299 (September 1988) and "Dilithium Initiators Based on 1,3,5-bis (1-phenylethenyl) benzene. Tetrahydrofuran and Lithium sec-Butoxide Effects" by R. P. Quirk and J-J. Ma, Polymer International, 24, pages 197–206 (1991) for difunctional initiators.

Following the coupling reaction, or when the desired coupling efficiency has been obtained, or when the trifunctional initiator - initiated reaction is complete, the product is neutralized such as by the addition of terminators, e.g. water, alcohol, or other reagents, for the purpose of removing the lithium radical forming the nucleus for the condensed polymer product. The product can then be recovered by coagulation by utilizing hot water or steam or both.

The concentration of the initiator can be regulated to control the molecular weight of the overall composition and of the polystyrene blocks. Generally, the initiator concentration is in the range of about 0.25 to about 50 millimoles per 100 grams of styrene monomer. The required initiator level frequently depends upon the solubility of the initiator in the hydrocarbon diluent. The ratio of the initiator to the monomer determines the block size, i.e. the higher the ratio of initiator to monomer, the smaller the molecular weight of the block.

Methods of controlling the molecular weights of the blocks and the molecular weight of the overall copolymer are well known. For instance, such methods are disclosed in U.S. Pat. Nos. 3,149,182, which states that different molecular weights can be achieved by keeping the amount of monomer constant and changing the amount of the catalyst or keeping the amount of catalyst constant and varying the amount of the monomer, and in U.S. 3,231,635, the disclosures of which are incorporated herein by reference, and many others. A typical three-armed block copolymer composition within the scope of the present invention, having a load-bearing capacity of 86%, a polystyrene block molecular weight of 12,000, a polystyrene content of 21% by weight, and an overall molecular weight of 226,000, as measured in polystyrene equivalent weight units, was prepared by polymerizing styrene with secondary butyl lithium as initiator at a monomer to initiator molar ratio of 115 to 1, polymerizing isoprene with this polystyryl lithium as initiator at a monomer to initiator molar ratio of 672 to 1, and then coupling this polystyrene-polyisoprenyl lithium diblock species with a trifunctional coupling agent.

The extending oils useful for compounding the pressure-sensitive adhesives of this invention are preferably essentially hydrocarbon process oils that are preferably low in aromatic content. By the term "essentially hydrocarbon oil" is meant an oil that comprises a major proportion of naphthenic oils, i.e., predominantly cycloaliphatic hydrocarbons having boiling points above 200° C. or paraffinic hydrocarbons having boiling points above 200° C. or both. For example, an analysis of the types of carbon atoms in oils useful for the compositions of this invention indicates that aromatic carbon atoms comprise no more than 5% of the oil, while naphthenic carbon atoms (i.e., carbons of cycloaliphatic compounds and the like) can range from about 25 to 60%, and paraffinic carbon atoms can range from about 35 to 75%. Accordingly, these oils are typically referred to as "naphthenic" or "paraffinic" process oils. Table A of U.S. Pat. No. 3,935,338, incorporated herein by reference, is particularly useful for describing extending oils.

These oils preferably have very low volatility. Initial boiling points, under normal ambient pressure conditions, can range from well over 400° F. (i.e., above about 200° C.) to almost 800° F. (almost 430° C.). The least volatile fraction in the process oils can have a boiling point in excess of about 1,000° F. (about 535° C.), so that the entire boiling range can cover several hundred degrees, e.g., 600 to 1,100° F. (315 to 600° C.).

The aromatic content of the oils as determined by clay gel analysis (in weight percent) can range from less than 1% up to 15% or more; however, aromatic content is preferably low and more preferably does not exceed about 5% by weight. The molecular weight of the oil is typically above 200 and can be above 600. Most naphthenic and paraffinic process oils, however, tend to have a molecular weight within the range of 250 to 600. If more than 20 parts extending oil per 100 parts copolymer is used in the adhesive composition, the shear strength is insufficiently high for box sealing purposes. If less than 5 parts extending oil per 100 parts copolymer is used in the adhesive composition, the tack is insufficiently high for box sealing purposes. Preferably, 6 to 12 parts extending oil per 100 parts copolymer is employed.

Although various types of tackifying resins are known, such as hydrogenated rosin esters, esters of polyhydric alcohols, phenol-aldehyde resins, and the like, the preferred tackifyings are of the type known as "hydrocarbon resins". In industrial practice "hydrocarbon resin" is a term of art relating to resins in the molecular weight range of a few hundred up to about 6,000 to 8,000 that are obtained or synthesized from hydrocarbonaceous materials such as petroleum, coal tar, turpentine, and the like. A good description of "hydrocarbon resins" can be found in Kirk-Othmer Encyclopedia of Chemical Technology, Second Edition, Volume II, Interscience, New York, 1966, pp. 242. Many of the so-called "hydrocarbon resins" commercially available today are "terpene" resins, i.e., polymers with repeating terpene units. These polymers can be homopolymers or copolymers (including terpolymers, etc.), since terpene is an olefin that can be copolymerized with other olefins. Terpene-phenols are also useful in this invention.

Resins useful for this invention have a ring-and-ball softening point of 80° C. to 135° C. Resins having softening points outside this range may be added to modify the specific properties of the adhesive. All hydrocarbon resins do not work with equal effectiveness, and a commercially available resin known as "WING-TACK 95" (available from Goodyear Chemical Company) is especially suited for use in this invention. This hydrocarbon resin is compatible with other components of the pressure-sensitive adhesive and has a softening point of 100° C. ±5° (ring-and-ball method; ASTM Test Method E28-67 (1982)). "WING-TACK 95" resin is a thermoplastic tackifying resin essentially comprising a copolymer of piperylene and 2-methyl-2-butene, which results from the cationic polymerization of a mixture containing 60% piperylene, 10% isoprene, 5% cyclopentadiene, 15% 2-methyl-2-butene, and about 10% dimer (see U.S. Pat. No. 3,935,338 and South African Patent No. 700,881). Other useful resins having the "WING-TACK" trademark are "WING-TACK PLUS" and "WING-TACK EXTRA", both of which are available from Goodyear Chemical Company. Other useful resins are available from Exxon Chemical Company under the trademark "ESCOREZ".

The tackifying resin is selected to provide the block copolymer with an adequate degree of tack to maintain in the resultant composition balanced pressure-sensitive adhesive properties including a high shear strength value. As is known in the art, not all tackifying resins interact with the same base elastomer in the same manner; therefore some minor amount of experimentation may be required to select the appropriate tackifying resin and to achieve optimum adhesive performance. Such minor experimentation is well within the capability of one skilled in the adhesive art. Along these lines, selection of the resin should take into account whether the resin associates with the monoalkenyl arene blocks or the conjugated diene blocks. Although the amount of tackifying resin may vary from about 25 parts to about 200 parts per 100 parts copolymer in the adhesive composition, the preferred range is 80 to 120 parts per 100 parts copolymer. At below 80 parts per 100 parts copolymer, tack levels are lower, but low temperature performance is improved. At above 120 parts per 100 parts copolymer, peel adhesion is usually excessively shocky.

The pressure-sensitive adhesive compositions of this invention may be formed by mixing radial block copolymer, tackifying resin, and extending oil, either in solution, as dry granules, or melt blending.

Hot-melt coatable pressure-sensitive adhesive compositions of this invention can be formulated with techniques known in the art through the use of heated mixers and the like. The copolymer and the extending oil can be blended together readily at moderately elevated temperatures, e.g., 200 to 350° F. (95 to 180° C.). The tackifying resin can be added to the copolymer/oil blend. Alternatively, the extending oil and tackifying resin can be admixed and then added to the copolymer. If a pigment is included in the pressure-sensitive adhesive composition, it should be added to the copolymer/oil blend before or at the same time that the tackifying resin is introduced into the composition to achieve optimum dispersion.

The resulting hot-melt coatable pressure-sensitive adhesive, once it is heated to the temperature where it will flow readily, can be applied to a backing, preferably a flexible backing, by any of the techniques known in the art, including flow coating, roller coating, knife coating, or the like. The pressure-sensitive adhesive composition may be applied to any conventional backing member such as paper, foil, polymeric film, release liners made of polymeric film or paper, woven or non-woven backing material, such as that used for packaging and fastening tapes. The pressure-sensitive adhesive composition can also be extruded into place by using a hot extruder or die face. The application of the pressure-sensitive adhesive composition by conventional hot melt extrusion equipment is easily facilitated because of the relatively low melt viscosity of this high shear strength adhesive.

The resulting coated backing material can then be slit, wound into rolls, converted into pads, or stacked in sheets, according to the desired end use.

As is known in the art, various other components can be added to modify the tack, rheology characteristics (including melt viscosity, thixotropy), adhesive bond strength characteristics, rate of "set", low temperature flexibility, color, odor, etc., of a hot-melt pressure-sensitive adhesive composition. For example, liquid or low-melting resins, i.e., resins having ring-and-ball softening points up to 40° C., can sometimes be used as a partial or total replacement or substitution for extending oils. In other words, these liquid or low-melting resins can be construed to be substantially equivalent to extending oils. However, such a substitution is not preferred in the context of this invention.

In the following examples, the adhesives and articles prepared therefrom were prepared in the following manner:

The copolymer for the adhesive composition, in the form of crumbs or pellets, was fed by means of a weigh feeder belt into the feed section of a co-rotating twin screw extruder having melting, mixing, and pumping elements. The tackifying resin was converted to molten form in a melt pot and pumped by means of a metering pump into one or more of the auxiliary ports in the extruder barrel. The extending oil was pumped by means of a metering pump into another of the auxiliary ports in the extruder barrel. The weigh feeder belt for the elastomer and the metering pumps for the tackifying resin and the extending oil were calibrated to provide the formulations set forth in Table I. Antioxidants were added in molten form to the molten tackifying resin in the melt pot prior to the introduction of the resin into the extruder. The antioxidants were selected from the group of alkyl substituted phenols and substituted phosphite antioxidants. The level of antioxidant ranged from 1 to 3 parts per 100 parts of copolymer. Wherever possible, the ingredients of the adhesive were protected from air by inert gas blanketing during the compounding steps.

It will be recognized by those of ordinary skill in the art that minor variations in the foregoing procedure may be necessary, depending on the characteristics of individual extruders.

The compounded extrudate, which was maintained at a temperature of 160 to 200° C., was delivered by means of a closed piping system to a positive displacement pump, which in turn delivered the molten adhesive through a coating die onto a backing material, which was transported by means of an appropriate web handling system. The backing material was biaxially oriented polypropylene film having a nominal thickness of 50 micrometers (2.0 mils). Both sides of the backing had been corona treated to provide a surface energy of at least 39 dynes/cm. Usually, the corona treatment provided surface energy of less than 44 dynes/cm. One corona treated surface was coated with a release layer of polyvinyl octadecyl carbamate/vinyl acetate copolymer at an average thickness of 0.1 to 0.5 micrometers.

The adhesive layer was coated on the corona treated surface opposite the surface containing the release layer.

The thickness of the adhesive layer in the examples was adjusted to provide a coating weight of 30 to 35 grams of adhesive per square meter of backing. It will be recognized by those of ordinary skill in the art that the coating weight of the adhesive may vary slightly depending on the design of the equipment, the skill of the operator, and the temperature or viscosity of the adhesive.

The hot adhesive on the web was quenched by passing the coated web around cooling rolls. The coated web was wound into a continuous roll, from which it could be slit to the desired width for testing and/or ultimate use.

The values of 180° peel adhesion were determined by ASTM Test Method 3330-87, 180° Peel Adhesion from Stainless Steel. The values reported are the average of two or more determinations and are reported in ounces of peel per one-inch width of coated pressure-sensitive tape at a crosshead or carriage rate of 12 inches per minute.

The values of shear strength were determined by ASTM Test Method 3654, 120° F. Shear to Stainless Steel. The values are reported in minutes until failure and are the average of two or more determinations. Typically, if the sample did not fail in approximately one day, i.e., more than 1000 minutes, the test was terminated, and the value is reported as the time to test termination followed by a "+" symbol.

In the examples, Polymer P1 was a styrene-isoprene-styrene linear elastomeric block copolymer of the prior art, widely used for preparing pressure-sensitive adhesive tapes and labels. Polymer P1 had a styrene content of 14% by weight, a molecular weight of about 216,000, expressed in polystyrene equivalent weight units, and a load-bearing capacity of 82%. The molecular weight of the polystyrene end block of Polymer P1 was about 11,000.

Polymer P2 was an experimental styrene-isoprene-styrene linear elastomeric block copolymer of the prior art, having a styrene content of 21% by weight, a molecular weight of about 170,000, expressed in polystyrene equivalent weight units, and a load-bearing capacity of 89%. The molecular weight of the polystyrene end block of Polymer P2 was about 12,000.

Polymer P3 was an $(AB)_3$-Z radial elastomeric block copolymer of this invention, having a styrene content of 23% by weight, a molecular weight of about 206,000, expressed in polystyrene equivalent weight units, and a load-bearing capacity of 90%. The molecular weight of the polystyrene end block of Polymer P3 was about 12,000. The other polymeric block (i.e., "B") of Polymer P3 was polyisoprene. Polymer P4 was an $(AB)_3$-Z radial elastomeric block copolymer of this invention, having a styrene content of 21% by weight, a molecular weight of about 226,000, expressed in polystyrene equivalent weight units, and a load-bearing capacity of 86%. The molecular weight of the polystyrene end block of Polymer P4 is about 12,000. The other polymeric block (i.e., "B") of Polymer P4 was polyisoprene.

Polymer P5 was a commercially available styrene-isoprene-styrene linear elastomeric block copolymer, having a styrene content of 21% by weight, a molecular weight of about 206,000, expressed in polystyrene equivalent weight units, and a load bearing capacity of 82%. The molecular weight of the polystyrene end block of Polymer P5 was about 15,000.

Several attempts were made to formulate hot melt adhesives with Polymer P5 by the procedures described herein, but the high pressures and temperatures encountered in the extrusion/mixing process exceeded the safety limits of the equipment. Although sample tapes were obtained in limited amounts, the test results are not meaningful on account of the excessive degradation of the adhesive ingredients in the process. Adhesive compositions of Polymer P5 can be readily formulated and coated from solvents, as taught in the prior art.

Examples 1, 2, and Comparative Examples A, B, C, and D compare adhesives containing Polymer P1, Polymer P2, and Polymer P3 in a series of experiments.

Examples 3-7 illustrate adhesives and tapes of the invention containing varying amounts of tackifying resin up to about 120 parts per 100 parts of copolymer and varying amounts of extending oil up to about 20 parts per 100 parts of copolymer.

In a second series of experiments, Examples 8-11 and Comparative Examples E, F, G, H, L, and M compare adhesives containing Polymer P1, Polymer P2, Polymer P3, or Polymer P4 and preferred amounts of extending oil with adhesives containing Polymer P1 and no extending oil. It will be recognized that the inclusion of extending oil provides a lower cost to the overall formulation.

Example 12 and Comparative Example K directly compare Polymer P1 and Polymer P4 in identical formulations, with only the copolymer being changed. The superior shear properties of the adhesive tapes of this invention are illustrated.

Examples 13-16 and Comparative Examples I, J, N, O, P, and Q illustrate adhesives containing Polymer P1, Polymer P2, or Polymer P4 with different tackifying resins.

Examples 17-19 and Comparative Examples R, S, T, U, V, and W further compare adhesives containing Polymer P1, Polymer P2, or Polymer P3 while the amount of tackifying resin was varied from 100 to 112 parts per 100 parts of copolymer and the amount of extending oil for Polymers P2 and P3 was varied from 6 to 10 parts per 100 parts of copolymer and the amount of extending oil for Polymer P1 was varied from 0 to 10 parts per 100 parts of copolymer.

The results of Examples 1-19 and Comparative Examples A-W are set forth in Table I. In Table I, the working examples of the invention are designated by Arabic numerals and the comparative examples are designated by the letter "C" followed by a letter of the alphabet, e.g. "A". Thus Comparative Example A is designated "CA". Table I lists the following data:
(a) Type of copolymer in formulation;
(b) Styrene content of copolymer (percent by weight);
(c) Parts by weight of copolymer in formulation;
(d) Type of tackifying resin (by trademark) in formulation;
(e) Parts by weight of tackifying resin in formulation;
(f) Parts by weight of extending oil in formulation;
(g) 180° peel adhesion of formulation; and
(h) 120° F. shear adhesion of formulation.

TABLE I

| Ex. No. | Type of copolymer | Amount of styrene (% by wt) | Amount of copolymer (parts) | Type of resin[a] | Amount of resin (parts) | Amount of oil[b] (parts) | 180° Peel (oz/in) | 120° F. Shear (min) |
|---|---|---|---|---|---|---|---|---|
| Ca | Polymer P2 | 21 | 100 | WE | 110 | 6 | 75 | 204 |
| 1 | Polymer P3 | 23 | 100 | WE | 110 | 10 | 78 | 1460 |
| 2 | Polymer P3 | 23 | 100 | WE | 110 | 6 | 74 | 1118 |
| CB | Polymer P1 | 14 | 100 | WE | 100 | 0 | 65 | 258 |
| CC | Polymer P1 | 14 | 100 | WE | 110 | 10 | 67 | 90 |
| CD | Polymer P2 | 21 | 100 | WE | 110 | 10 | 72 | 435 |
| 3 | Polymer P3 | 23 | 100 | WE | 110 | 10 | 74 | 1400+ |
| 4 | Polymer P3 | 23 | 100 | WE | 110 | 17 | 73 | 403 |
| 5 | Polymer P3 | 23 | 100 | WE | 104 | 13 | 75 | 1300+ |
| 6 | Polymer P3 | 23 | 100 | WE | 117 | 10 | 80 | 901 |
| 7 | Polymer P3 | 23 | 100 | WE | 103 | 19 | 70 | 246 |
| CE | Polymer P1 | 14 | 100 | WE | 100 | 0 | 73 | 71 |
| CF | Polymer P1 | 14 | 100 | WE | 110 | 0 | 74 | 92 |
| CG | Polymer P1 | 14 | 100 | WE | 110 | 10 | 74 | 29 |
| CH | Polymer P1 | 14 | 100 | WE | 110 | 6 | 72 | 61 |
| 8 | Polymer P4 | 21 | 100 | WE | 110 | 10 | 71 | 320 |
| 9 | Polymer P4 | 21 | 100 | WE | 110 | 6 | 77 | 830 |
| 10 | Polymer P3 | 23 | 100 | WE | 110 | 10 | 68 | 1350+ |
| 11 | Polymer P3 | 23 | 100 | WE | 110 | 6 | 70 | 1290+ |
| CI | Polymer P2 | 21 | 100 | ES | 110 | 10 | 69 | 131 |
| CJ | Polymer P2 | 21 | 100 | WP | 110 | 6 | 80 | 206 |
| CK | Polymer P1 | 14 | 100 | WE | 110 | 6 | 86 | 43 |
| 12 | Polymer P4 | 21 | 100 | WE | 110 | 6 | 81 | 525 |
| CL | Polymer P2 | 21 | 100 | WE | 110 | 10 | 76 | 156 |
| CM | Polymer P2 | 21 | 100 | WE | 110 | 6 | 70 | 420 |
| CN | Polymer P1 | 14 | 100 | ES | 110 | 10 | 65 | 26 |
| CO | Polymer P1 | 14 | 100 | WP | 110 | 6 | 74 | 34 |
| CP | Polymer P1 | 14 | 100 | ES | 110 | 6 | 65 | 63 |
| 13 | Polymer P4 | 21 | 100 | WP | 110 | 10 | 72 | 539 |
| 14 | Polymer P4 | 21 | 100 | ES | 110 | 10 | 68 | 615 |
| 15 | Polymer P4 | 21 | 100 | WP | 110 | 6 | 72 | 1010 |
| 16 | Polymer P4 | 21 | 100 | ES | 110 | 6 | 66 | 1280 |
| CQ | Polymer P2 | 21 | 100 | WP | 110 | 10 | 75 | 296 |
| CR | Polymer P1 | 14 | 100 | WE | 100 | 0 | 80 | 69 |
| 17 | Polymer P3 | 23 | 100 | WE | 112 | 10 | 71 | 675 |
| 18 | Polymer P3 | 23 | 100 | WE | 110 | 8 | 70 | 1120 |
| 19 | Polymer P3 | 23 | 100 | WE | 107 | 6 | 70 | 1475+ |
| CS | Polymer P1 | 14 | 100 | WE | 105 | 8 | 66 | 900 |
| CT | Polymer P1 | 14 | 100 | WE | 100 | 0 | 77 | 42 |
| CU | Polymer P1 | 14 | 100 | WE | 110 | 0 | 83 | 68 |
| CV | Polymer P1 | 14 | 100 | WE | 110 | 10 | 75 | 35 |
| CW | Polymer P2 | 21 | 100 | WE | 110 | 10 | 77 | 145 |

[a] WE represents "WINGTACK EXTRA" hydrocarbon resin, available from the Goodyear Tire and Rubber Company.
ES represents "ESCOREZ 1310LC" hydrocarbon resin, available from Exxon Chemical Company USA.
WP represents "WINGTACK PLUS" hydrocarbon resin, available fro the Goodyear Tire and Rubber Company.
[b] The extending oil had the trademark "SHELLFLEX 371N", available from Shell Oil Company.

It can readily be seen from Table I that formulations containing Polymer P3 or Polymer P4 have significantly better shear properties than do formulations containing Polymer P1 or Polymer P2. Examples 1 and 2 illustrate the preferred range of extending oil (namely, 6 to 12 parts by weight per 100 parts by weight of copolymer) in the adhesive of the tapes of this invention. Comparative Examples B and C illustrate that even a moderate amount of extending oil drastically reduced the shear properties of adhesives of the prior art.

The shear adhesion properties of tapes utilizing adhesives containing Polymer P3 or Polymer P4 are significantly improved without a significant sacrifice in peel adhesion properties.

The extraordinary shear performance of the adhesive compositions of this invention is clearly illustrated by Examples 13–16.

Various modifications and alterations of this invention will become apparent to those skilled in the art without departing from the scope and spirit of this invention, and it should be understood that this invention not to be unduly limited to the illustrative embodiments set forth herein.

What is claimed is:

1. A normally tacky pressure-sensitive adhesive composition comprising (1) a radial teleblock copolymer having at least three monoalkenyl arene polymer blocks and a branched elastomeric conjugated diene polymer block, (2) a tackifying resin, and (3) from about 5 to about 20 parts . by weight extending oil per hundred parts by weight of radial copolymer.

2. A normally tacky pressure-sensitive adhesive composition comprising:
   (a) a radial teleblock copolymer of the formula:

$(A-B)_n-Z$ wherein
   A represents a monoalkenyl arene polymer block linked to an elastomeric conjugated diene polymer block,
   B represents an elastomeric conjugated diene polymer block,
   n represents an integer equal to or greater than 3,
   Z represents a multifunctional linking agent;
   (b) a tackifying resin; and
   (c) an extending oil in an amount of 5 to 20 parts by weight per hundred parts by weight of said copolymer.

3. The composition of claim 2, wherein said monoalkenyl arene polymer blocks of said copolymer comprise polystyrene blocks.

4. The composition of claim 3, wherein said polystyrene blocks have a molecular weight of from about 11,000 to about 13,000.

5. The composition of claim 2, wherein said monoalkenyl arene polymer blocks comprise from about 17 to about 23% by weight of said copolymer.

6. The composition of claim 2, wherein said elastomeric conjugated diene polymer blocks comprise from about 83 to about 77% by weight of said copolymer.

7. The composition of claim 2, wherein said elastomeric conjugated diene polymer blocks of said copolymer comprise polyisoprene blocks.

8. The composition of claim 2, wherein Z represents the residue of a coupling agent.

9. The composition of claim 2, wherein Z represents the residue of an initiator.

10. The composition of claim 2, wherein the molecular weight of said copolymer ranges from about 180,000 to about 250,000.

11. The composition of claim 2, wherein the load-bearing capacity of said copolymer is at least 85%.

12. The composition of claim 2, wherein said tackifying resin has a ring-and-ball softening point of from about 80° C. to about 135° C.

13. The composition of claim 2, wherein said tackifying resin is present in an amount of from about 25 parts to about 200 parts by weight per hundred parts by weight of said copolymer.

14. The composition of claim 2, wherein said tackifying resin is present in an amount of from about 80 parts to about 120 parts by weight per hundred parts by weight of said copolymer.

15. The composition of claim 2, wherein the aromatic content of said extending oil comprises no more than 15% by weight of said oil.

16. The composition of claim 2, wherein the aromatic content of said extending oil comprises no more than 5% by weight of said oil.

17. The composition of claim 2, wherein said extending oil is present in an amount of 6 to 12 parts by weight per hundred parts by weight of said copolymer.

18. The composition of claim 2, wherein said composition is hot-melt coatable.

19. The composition of claim 2, wherein said monoalkenyl arene polymer blocks comprise from about 17 to about 23% by weight of said copolymer and the molecular weight of said copolymer ranges from about 180,000 to about 250,000.

20. The composition of claim 2, wherein n represents the integer 3.

21. The composition of claim 2, wherein n represents the integer 4.

22. An article comprising a substrate having on at least one major surface thereof a layer of the composition of claim 2.

23. A tape comprising a backing having on at least one major surface thereof a layer of the composition of claim 2.

24. The tape of claim 23 wherein said backing is made of paper.

25. The tape of claim 23 wherein said backing is made of a polymeric material.

26. The tape of claim 23 wherein said backing is made of biaxially oriented polypropylene film.

* * * * *

UNITED STATES PATENT AND TRADEMARK OFFICE
CERTIFICATE OF CORRECTION

PATENT NO. : 5,183,705

DATED : February 2, 1993

INVENTOR(S) : Birkholz et al.

It is certified that error appears in the above-identified patent and that said Letters Patent is hereby corrected as shown below:

On the cover page, after "Inventors:", please add an Inventor.
After "St. Paul,", insert -- Richard L. Talbott, White Bear Township, --.
After "Township,", delete "both", insert -- all --.

Signed and Sealed this

Twenty-first Day of December, 1993

Attest:

BRUCE LEHMAN

Attesting Officer    Commissioner of Patents and Trademarks